United States Patent [19]

Khawand

[11] 4,330,161
[45] May 18, 1982

[54] STORAGE UNIT FOR TAPE CASSETTES

[76] Inventor: Antoine B. Khawand, 170 West End Ave., New York, N.Y. 10023

[21] Appl. No.: 64,187

[22] Filed: Aug. 6, 1979

[51] Int. Cl.$^3$ .................. A47B 81/06; A47B 96/06
[52] U.S. Cl. ................................. 312/9; 312/13; 312/14; 312/18; 312/233; 248/205 A; 206/387; 24/DIG. 11
[58] Field of Search .................. 312/8, 9, 10, 11, 12, 312/13, 14, 15, 16, 17, 18, 19, 20, 233; 206/387, 460; 248/205 A; 24/DIG. 11, 73 VA

[56] References Cited

U.S. PATENT DOCUMENTS

| 253,392 | 2/1882 | Jones | 24/73 VA |
| 1,268,141 | 6/1918 | Nystrom | 312/12 |
| 1,997,585 | 4/1935 | Hunter | 312/233 |
| 2,142,194 | 1/1939 | Karfiol | 206/460 |
| 2,494,382 | 1/1950 | Faulkner et al. | 312/233 |
| 2,510,263 | 6/1950 | Stein | 24/DIG. 11 |
| 2,547,487 | 4/1951 | Penney | 24/DIG. 11 |
| 3,107,816 | 10/1963 | Teague, Jr. et al. | 312/18 |
| 3,265,453 | 8/1966 | Seide | 312/13 |
| 3,391,792 | 7/1968 | Makar | 312/13 |
| 3,499,102 | 3/1970 | Gillemot et al. | 248/205 A |
| 3,508,803 | 4/1970 | Redick | 312/233 |
| 3,620,361 | 11/1971 | Fugiwara | 206/387 |
| 3,829,132 | 8/1974 | Willieme | 206/387 |
| 4,067,629 | 1/1978 | Amatsu et al. | 312/20 |

FOREIGN PATENT DOCUMENTS

| 934525 | 10/1973 | Canada | 24/73 VA |
| 612532 | 3/1978 | Switzerland | 206/387 |
| 1540795 | 5/1977 | United Kingdom | 206/387 |

Primary Examiner—Victor N. Sakran
Attorney, Agent, or Firm—Darby & Darby

[57] ABSTRACT

A storage unit for a plurality of items such as tape cassettes, and video tape recorder (VTR) cassettes, including a container which has a number of pivotal elements, each of said elements holding a cassette box which permits the box to be pivoted outward from the storage unit and the box opened to remove the cassette.

9 Claims, 11 Drawing Figures

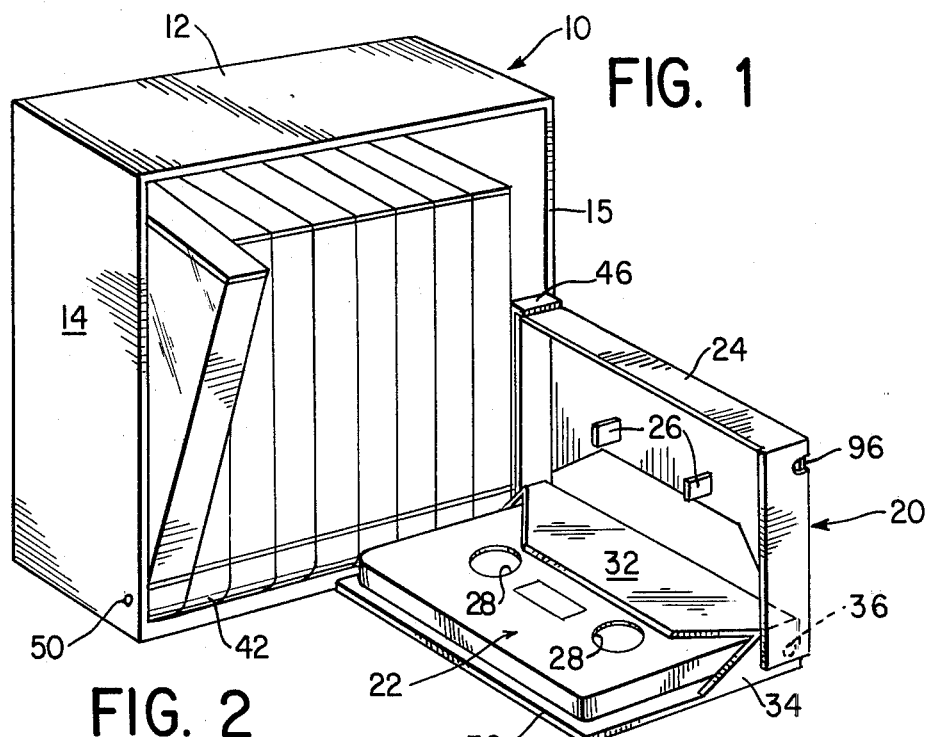
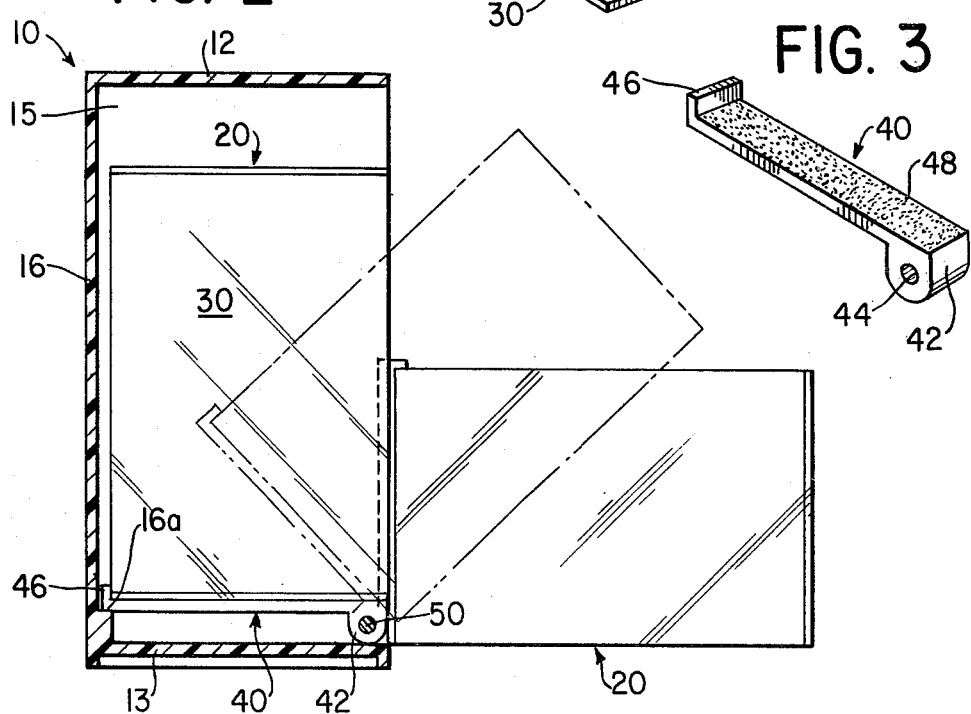

U.S. Patent May 18, 1982 Sheet 2 of 2 4,330,161
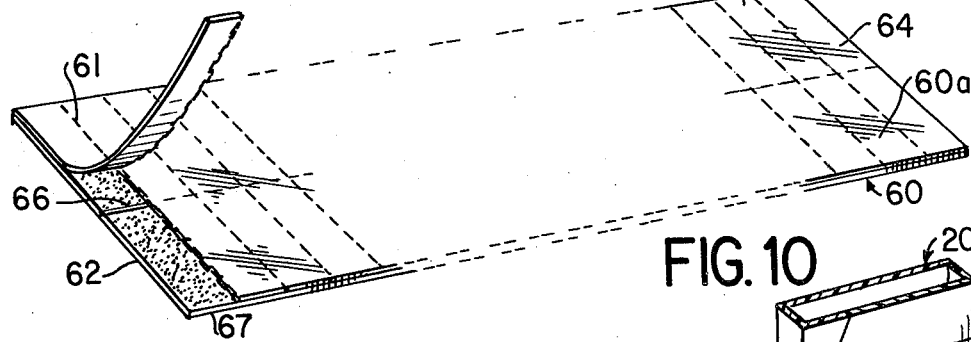
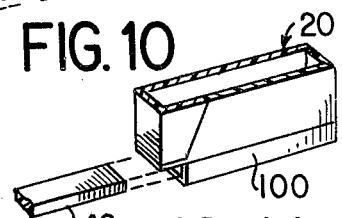
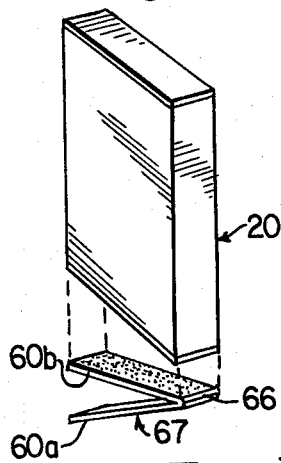
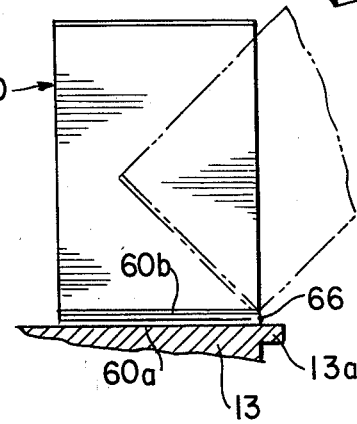
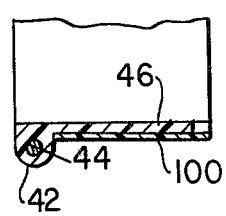
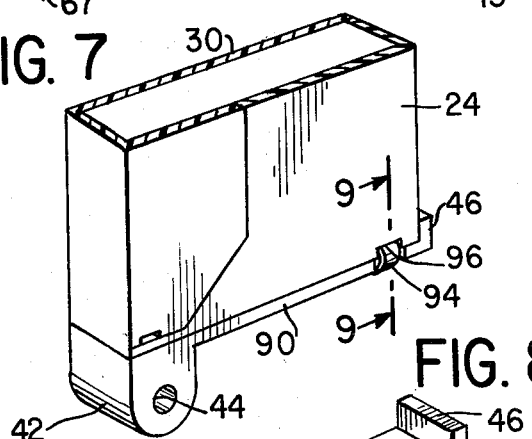
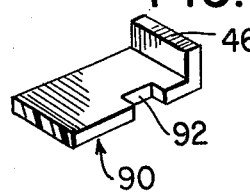

STORAGE UNIT FOR TAPE CASSETTES

The use of magnetic tape cassettes for tape recorders and players and video tape recorders and players has become quite popular. In general a cassette is sold in a hinged box which has a cardboard portion on which is printed the information relating to the material recorded on the cassette. A problem arises in the storage of the cassette in a manner which permits ready access to the cassette as well as identification of the subject matter which is stored in the box containing the cassette. Various types of storage units have been prepared, most of these being containers which are shaped to hold a plurality of cassette boxes. In these prior art storage units, a problem arises in attempting to remove an individual box, due to space restrictions, and to replace the box. Also, when a cassette is removed from a box which has been taken from the storage unit, sometimes the box is misplaced and the cassette thereafter is unprotected.

The present invention relates to a storage unit for a plurality of such cassette boxes in a manner such that the cassette box is placed in the storage unit in a manner such that it can be pivoted outward from the unit and opened to remove the cassette without taking the box out of the storage unit. The cassette, after use, is replaced in the box which is then pivoted back into the storage unit. A variety of pivotal mounting means are disclosed which are relatively simple, including one type which is formed of a double-face adhesive tape.

It is therefore an object of the present invention to provide a storage unit for a plurality of items such as cassettes which permits the boxes for the cassettes to be pivoted from the storage unit.

Another object is to provide a storage unit for cassettes in which a number of pivotally mounted boxes are located therein in a readily accessible manner and also permits the cassettes to be located in a predetermined place so that a library is formed.

A further object is to provide a storage units for cassette boxes in which a plurality of the boxes are pivotally mounted to the unit by a variety of different types of hinge means.

Other objects and advantages of the present invention will become more apparent upon reference to the following specification and annexed drawings in which:

FIG. 1 is a perspective view of the storage unit showing a number of cassette boxes with one of the boxes open;

FIG. 2 is a side elevational view in section of the unit of FIG. 1;

FIG. 3 is a perspective view of one of the pivoting elements;

FIG. 4 is a perspective view of a further type of pivoting element;

FIG. 5 is a perspective view showing the pivoting element of FIG. 4 in use;

FIG. 6 is a side elevational view also showing the use of the pivoting element of FIG. 4;

FIG. 7 is a fragmentary perspective view of a portion of a cassette box showing a further type of pivoting element;

FIG. 8 is a fragmentary perspective view showing the details of the pivoting element of FIG. 7;

FIG. 9 is a cross-sectional view along lines 9—9 of FIG. 8 showing the end of the pivotal mounting element; and FIGS. 10 and 11 are respectively a perspective view and cross-sectional view of a further embodiment of the invention.

Referring to FIGS. 1–3, the storage unit 10 is of a generally rectangular shape and includes upper and lower walls 12 and 13 and side walls 14 and 15 as well as a back wall 16. The container 10 can be made of any suitable material, for example, plastic which is injection molded, or pieces of plastic which are attached together, such as by an adhesive. The storage unit 10 is adapted to hold a number of cassette boxes 20, one of which is illustratively shown in detail at the right hand end of the unit. Each of the cassette boxes 20 is adapted to hold a magnetic tape cassette 22 of standard construction. Each cassette box 20 is of standard construction and includes a bottom section 24, which is usually of an opaque material. Bottom section 24 has a pair of upstanding posts 26 which fit within the holes 28 of the cassette 22 to hold it in position.

The cassette box 20 has a cover 30 which is generally of transparent material. The cover 30 is formed with a U-shaped folded back lip 32 at one of its edges, the space between the cover 30 and the lip 32 being sufficiently large to hold a cassette 22 therebetween. A partial side wall 34 joins each side edge of the cover 30 to the cover lip 32. The cover 30 is hinged to the bottom section 24 about a point 36, this generally being by an interlocking arrangement of pieces on the sections 24 and 30. The two sections of box 20 are usually made of plastic.

Usually, there will be a piece of printed cardboard or paper in the space between the cover 30 and the lip 32, to identify the cassette which is located within the box. The cardboard can extend over the cover. Also, an adhesive label may be placed on the cassette itself.

As shown in FIG. 1, a number of cassette boxes 20 are pivotally mounted in the storage unit 10. This is accomplished by a pivotal mounting element 40 which is best shown in FIGS. 2 and 3. The mounting element 40 includes a hinge knuckle 42 at one end with a hole 44 therethrough. At the other end is an upstanding finger 46, the distance between the inner face of finger 46 and the other end of the element 40 being the length of a cassette box along one of the short sides of the bottom section 24. The upper face of the element 40 is provided with adhesive 48. During shipping of the storage unit and prior to the placing of the storage boxes therein, the adhesive 48 is preferably covered by a paper (now shown) which is removed when the box is to be fastened thereto. As an alternative to this, a strip of double face adhesive can be provided, one of the faces being affixed to element 40.

Referring to FIGS. 1 and 2, a number of the pivotal mounting elements 40 are placed in the storage unit 10 by a pin 50 which passes through the holes 44 in the knuckles 44 is mounted between the unit side walls 14. As seen in FIG. 2, the back wall 16 of the unit has a ledge 16a on which the lower face of the elements rest. Thus, all of the elements can be held in a generally horizontal position within the unit 10.

To use the storage unit of FIGS. 1–4, it is only necessary to tilt out one of the elements 40, remove the protective paper from the adhesive 48 and to affix the end wall of the bottom section 24 of the cassette box to the adhesive surface. The finger 46 serves as a locator for the box. Each of the elements 40 is tilted out and a box 20 affixed to its adhesive surface 48 in the same way. It is preferred that the covers 30 all face in the same direction. If double face adhesive strips are used, a strip can be first affixed to the box and the box then affixed to the element 40.

With all of the cassette boxes 20 mounted to the elements 40 and in the stored position in the unit, the printed indicia between the cover 30 and lip 32 is viewable. Thus, the user can see at a glance all of the cassettes which are stored in the unit. When it is desired to remove one of the cassettes for use, it is only necessary to pivot its box outwardly from unit 10. As seen in FIG. 1, there is a space between the top of each box 20 and the unit top wall 12. This permits the user to insert his finger and pivot the box down as well as to give clearance for the top of the cassette box for the pivoting action.

As a box pivots outwardly, the end of the hinge knuckle 42 rests on the bottom wall 13. This provides a stop to hold the box in a position generally transverse to the unit, as shown in FIG. 1. The user then opens the cover 30, as shown in FIG. 1, and removes the cassette. After the cassette is played, the user re-inserts it into the box, closes the box cover 30 and pivots the box back up into the unit. In this manner easy access is had to any of the cassettes for removal and for return to the stored position. Also, all of the titles of the material of the various cassettes are displayed.

FIGS. 4-7 show a simplified type of holding and pivoting element 60. This is formed by a piece of material having an adhesive surface 62 which is shown covered by a protective paper 64. The piece of material 60 can be, for example, thin sheet plastic. The piece of material 60 is relieved slightly along a medial line 66 to form a hinge so that the material can be bent back on itself, as shown for a single strip 67 of the material in FIG. 5. This leaves a front section 60a and a rear section 60b for the material whose upper faces are coated with the adhesive. The front and rear sections 60a, 60b are cut or partly scored, along lines 61 to form a number of individual strips 67 of a width equal to the width of the bottom section of a cassette box 20.

In operation, a strip 67 is torn off the piece 60 and the protective covering 64 removed. The strip is bent along the medial hinge line 66 and the section 60a is fastened to the bottom wall 13 of the unit. An end wall of the cassette box 20 (see FIG. 7) is then fastened to the section 60b. The order of these two steps can be reversed. Each strip 67 then acts as a hinge about its medial line 66 so that a cassette box can be pivoted, as shown in FIG. 6. In this embodiment, a ledge 13a can be formed on the front of the bottom wall 13 to serve as a stop for the box. The operation of selecting, opening and returning the various boxes is as previously described.

The adhesive material can be previously cut with a length equal to the length of the storage unit 10 between side walls 14-15. In this case, section 60a can be a solid piece and prefastened to the bottom wall 13. Then only the section 60a is cut to form the individual strips 67. Any combination of a totally or partially pre-cut or pre-scored piece of material 60 can be used.

FIGS. 7-9 show a further modification of the invention. Here the pivoting element 90 is of a form similar to element 40 of FIGS. 1-3 with a hinge knuckle 42 and an opening 44. Near the finger 46 at the end of the element a slot 92 is cut out. A thin, U-shaped spring clip 94 has its bent portion placed in the slot 92 with the lower arm around the element 90 and the upper arm inserted in an opening 96 in the box cover to fit around an end wall of the box bottom sections 24. To assist in the placement of the spring, a notch can be cut in the box. In this way, the box is securely fastened to the pivoting element 90. The use of the storage element is as previously described.

In the embodiment of FIGS. 10-11 a hollow U-shaped piece 100 is attached, such as by an adhesive, to an end wall of the bottom of the box 20. Here, the end of element 40 of FIGS. 1-3 is made so that the finger 46 is of a height such that a tight wedging fit is produced as the U-shaped piece is pushed over the element. This is a modified way of fastening the box to the pivoting element. Where the U-shaped piece 100 is provided, the element 40 is formed to produce any suitable type of a wedging fit. This can be accomplished along the width or thickness of the element of, for example, by forming the element with a pair of separated arms along its length which have a spring action. The embodiment of FIGS. 10-11 has a further advantage in that the box can be easily removed and replaced from the element.

While the storage unit has been described for use with tape cassettes, it should be understood that it will operate with any other type of boxes similar to the cassette boxes. These can be, for example, boxes for VTR cassettes or cartridges. The invention also can be adapted for record albums with the holding means being attached to the album jacket and the record removed from the jacket once it has been pivoted out from the container.

What is claimed is:

1. A storage system comprising at least one box of the type for holding cassettes and the like having a bottom section and a cover which is hinged to said bottom section to permit movement of the cover relative thereto, a housing, at least one holding means including an arm formed by a solid piece of material which extends for substantially the entire length of the bottom section of said box, means for detachably coupling said arm to said bottom section of a said box, and means including hinge means for attaching said holding means to said housing to permit pivoting of said arm of said holding means and the box fastened thereto only inwardly and outwardly of said housing, said holding means and said attaching means permitting the cover of the cassette box to be opened and closed relative to the bottom section of the cassette box when the cassette box is extended from the housing and coupled thereto by said holding means and said attaching means.

2. A storage system as in claim 1 wherein said arm of said holding means comprises a piece of non-rigid flat material having an adhesive thereon which comprises said fastening means, said hinge means of said attaching means formed by a portion of said piece of material which can bend the hinge at an angle of at least about 90°.

3. A storage system as in claim 2 wherein said means for attaching said holding means to said housing comprises an extension of said piece of material, said extension having an adhesive thereon for attachment to said housing.

4. A storage system as in claim 1 wherein said detachable coupling means comprises clip means connected to said arm and for connection to said box.

5. A storage system as in claim 1 wherein said detachable coupling means comprises receptacle means for mounting on said box, said arm of said holding means adapted to extend into said receptacle means, said hinge means being formed as a part of said arm.

6. A storage system as in claim 3 wherein said holding and attaching means are formed as a single sheet of material with a plurality of arms being cut from said single sheet of material to form a plurality of holding means.

7. A storage system as in claim 5 wherein said receptacle means includes adhesive means for mounting to a said box.

8. A storage system comprising at least one box of the type for holding cassettes and the like having a bottom section and a cover which is hinged to said bottom section to permit movement of the cover relative thereto,
- a housing,
- at least one holding means including an arm having adhesive means thereon for fastening said arm to said bottom section of a said box,
- and means including hinge means for attaching said holding means to said housing to permit pivoting of said arm of said holding means and the box fastened thereto only inwardly and outwardly of said housing,
- said holding means and said attaching means permitting the cover of the cassette box to be opened and closed relative to the bottom section of the cassette box when the cassette box is extended from the housing and coupled thereto by said holding means and said attaching means.

9. A storage system as in claim 8 wherein said arm of said holding means is a solid piece which extends for substantially the entire length of the bottom section of a said box, the adhesive means for fastening the arm to the bottom section of said box located on the upper surface of said solid piece, said hinge means being formed as part of said arm and including a hinge knuckle having an opening, and a hinge pin passing through said knuckle and attached to the storage unit.

* * * * *